(12) United States Patent
Ayichew et al.

(10) Patent No.: US 10,272,888 B2
(45) Date of Patent: Apr. 30, 2019

(54) SYSTEMS AND METHODS FOR AIRCRAFT EMERGENCY AND PARK BRAKES

(71) Applicant: GOODRICH CORPORATION, Charlotte, NC (US)

(72) Inventors: Efrem E. Ayichew, Troy, OH (US); Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 66 days.

(21) Appl. No.: 15/373,593

(22) Filed: Dec. 9, 2016

(65) Prior Publication Data
US 2018/0162331 A1   Jun. 14, 2018

(51) Int. Cl.
| B60T 7/16 | (2006.01) |
| B60T 8/17 | (2006.01) |
| B64C 25/44 | (2006.01) |

(52) U.S. Cl.
CPC .............. B60T 7/16 (2013.01); B60T 8/1703 (2013.01); B64C 25/44 (2013.01)

(58) Field of Classification Search
None
See application file for complete search history.

(56) References Cited

U.S. PATENT DOCUMENTS

| 8,641,154 B2 | 2/2014 | Griffith et al. |
| 8,733,847 B2 | 5/2014 | Thibault et al. |
| 9,108,602 B2 | 8/2015 | Griffith et al. |
| 2008/0133073 A1* | 6/2008 | Griffith .................. B60T 13/02 701/9 |
| 2010/0274458 A1* | 10/2010 | Cahill .................. B60T 8/1703 701/76 |
| 2011/0018337 A1* | 1/2011 | King ..................... B60T 8/1703 303/13 |
| 2012/0006634 A1 | 1/2012 | Uwe et al. |
| 2015/0291280 A1* | 10/2015 | Iordanidis ............ B60T 8/1703 244/111 |
| 2016/0009384 A1* | 1/2016 | Di Zazzo ................ B60T 7/085 188/1.11 E |
| 2016/0124428 A1* | 5/2016 | Nutaro ................. G05D 1/0011 701/2 |

FOREIGN PATENT DOCUMENTS

| EP | 2982601 A1 | 2/2016 |
| EP | 3056396 A1 | 8/2016 |
| GB | 2450796 A | 1/2009 |
| GB | 2469702 A | 10/2010 |

OTHER PUBLICATIONS

EP Search Report dated Mar. 6, 2018 App No. 17206453.7.

* cited by examiner

*Primary Examiner* — Rami Khatib
(74) *Attorney, Agent, or Firm* — Snell & Wilmer, L.L.P.

(57) ABSTRACT

Systems and methods for an aircraft emergency and park brake system are disclosed. The emergency and park brake system may comprise an emergency and park brake controller. The emergency and park brake controller may be configured to receive brake signals from mechanical and electrical inputs, generate a braking command comprising data from the brake signal, and transmit the braking command to control braking force. The emergency and park brake controller may receive brake signals from multiple locations including from the aircraft and from a remote location.

19 Claims, 4 Drawing Sheets

SYSTEMS AND METHODS FOR AIRCRAFT EMERGENCY AND PARK BRAKES

FIELD

The present disclosure relates to aircraft parking brakes, and more specifically, to systems and methods for controlling aircraft brakes in emergency and park conditions.

BACKGROUND

Aircraft typically have brakes on the wheels to slow the aircraft during rejected takeoffs, landing, and taxiing. Failures may occur in the brakes, the brake control systems, brake pedals sensors, and/or the like, causing compromised brake control, un-commanded braking, and/or the like. Typically, aircraft may employ dissimilar, independent, separate, and/or redundant channels for emergency braking to mitigate failure events and to meet aircraft safety guidelines.

SUMMARY

In various embodiments, an emergency brake system for an aircraft is disclosed. The emergency and park brake system may comprise an emergency and park controller and at least one of a position encoder or a remote emergency and park interface in electronic communication with the emergency and park controller. The position encoder or the remote emergency and park interface may be configured to transmit at least one of an emergency brake signal or a park brake signal to the emergency and park controller. The emergency and park controller may be configured to generate a braking command in response to receiving at least one of the emergency brake signal or the park brake signal.

In various embodiments, the emergency and park brake system may further comprise a brake pressure modulating valve in electronic communication with the emergency and park controller, wherein the brake pressure modulating valve is configured to control a fluid pressure to an aircraft brake in response to receiving the braking command from the emergency and park controller. In various embodiments, the emergency and park brake system may further comprise an electromechanical actuator controller (EMAC) in electronic communication with the emergency and park controller, wherein the EMAC is configured to control a braking force in an aircraft brake in response to receiving the braking command from the emergency and park controller. In various embodiments, the emergency and park brake system may further comprise an emergency brake handle in operable communication with the position encoder, wherein the position encoder is configured to measure a displacement of the emergency brake handle. In various embodiments, the position encoder may be configured to transmit the emergency brake signal related to the displacement of the emergency brake handle to the emergency and park controller. In various embodiments, the remote emergency and park interface may comprise an emergency switch configured to receive input related to the emergency brake signal and a park switch configured to receive input related to the park brake signal. In various embodiments, the emergency brake signal may comprise at least one of a variable emergency brake signal or a single emergency brake signal. In various embodiments, the park brake signal may comprise at least one of a variable park brake signal or a single park brake signal. In various embodiments, the emergency and park controller may be configured to generate a brake status signal representative of a current state of the aircraft brake.

In various embodiments, a method of controlling an emergency and park brake system is disclosed. The method may comprise receiving, by an emergency and park controller, a brake signal. The method may comprise generating, by the emergency and park controller, a braking command comprising data related to the brake signal. The method may comprise transmitting, by the emergency and park controller, the braking command.

In various embodiments, the brake signal may comprise an emergency brake signal having at least one of a variable emergency brake signal or a single emergency brake signal. In various embodiments, the brake signal may comprise a park brake signal having at least one of a variable park brake signal or a single park brake signal. In various embodiments, the brake signal may be transmitted to the emergency and park controller by at least one of a position encoder or a remote emergency and park interface. In various embodiments, the position encoder may be configured to measure a displacement of an emergency brake handle, and transmit the brake signal related to the displacement of the emergency brake handle.

In various embodiments, an emergency and park brake system is disclosed. The emergency and park brake system may comprise an emergency and park controller having a processor. The emergency and park brake system may also comprise a tangible, non-transitory memory configured to communicate with the processor, the tangible, non-transitory memory having instructions stored thereon that, in response to execution by the processor, cause the emergency and park brake system to perform operations. The operations may comprise receiving, by the processor, a brake signal; generating, by the processor, a braking command comprising data related to the brake signal; and transmitting, by the processor, the braking command to an aircraft brake.

In various embodiments, the brake signal may comprise an emergency brake signal having at least one of a variable emergency brake signal or a single emergency brake signal. In various embodiments, the brake signal may comprise a park brake signal having at least one of a variable park brake signal or a single park brake signal. In various embodiments, the emergency and park brake system may further comprise a remote emergency and park interface in electronic communication with the processor, wherein the remote emergency and park interface is configured to transmit the brake signal to the processor. The operations may further comprise generating, by the processor, a brake status signal representative of a current state of the aircraft brake. The operations may further comprise transmitting, by the processor, the brake status signal to the remote emergency and park interface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
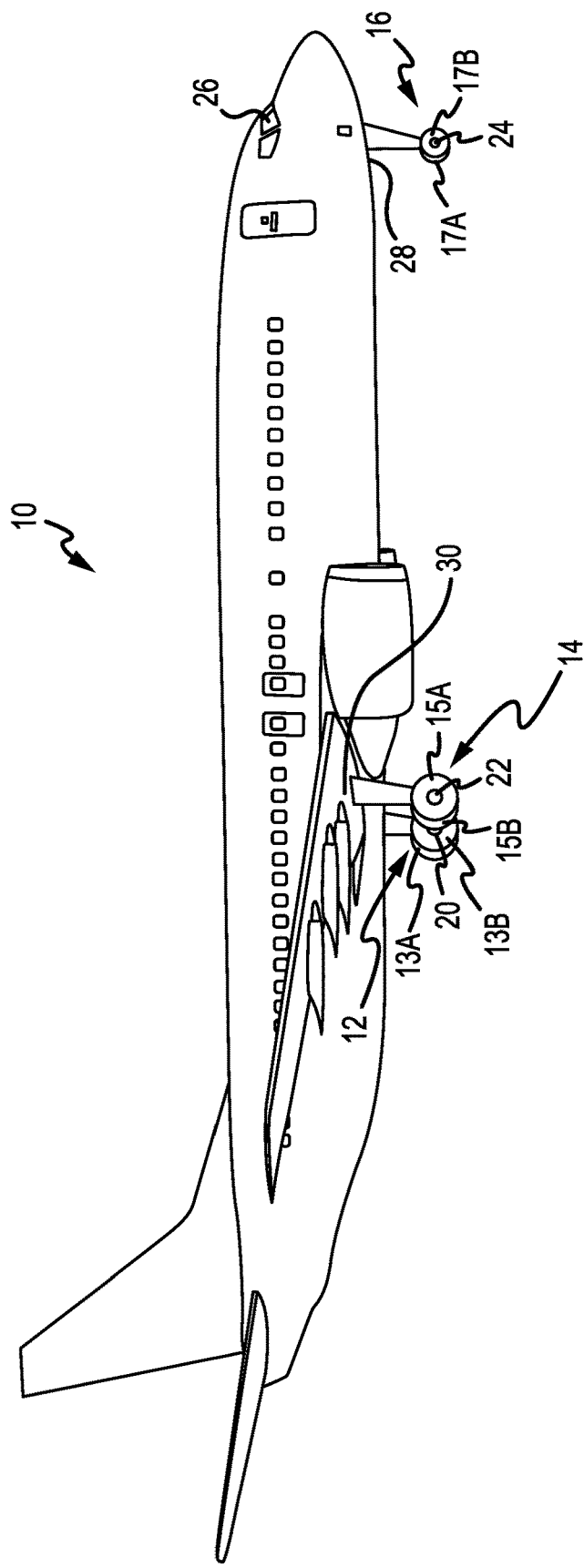
FIG. 1 illustrates an exemplary aircraft having an emergency and park brake system, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Aircraft wheel and brake assemblies may include a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

Referring now to FIG. 1, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Aircraft 10 may also include a primary brake system, which may be applied to any wheel of any landing gear. The primary brake system of aircraft 10 may comprise a collection of subsystems that produce output signals for controlling the braking force and/or torque applied at each wheel (e.g., wheel 13A, wheel 13B, wheel 15A, wheel 15B, wheel 17A, and/or wheel 17B). The primary brake system may communicate with the brakes of each landing gear (e.g., main landing gear 12, main landing gear 14, and/or nose landing gear 16), and each brake may be mounted to each wheel to apply and release braking force on one or more wheels (e.g., as described above).

Figure 2A:
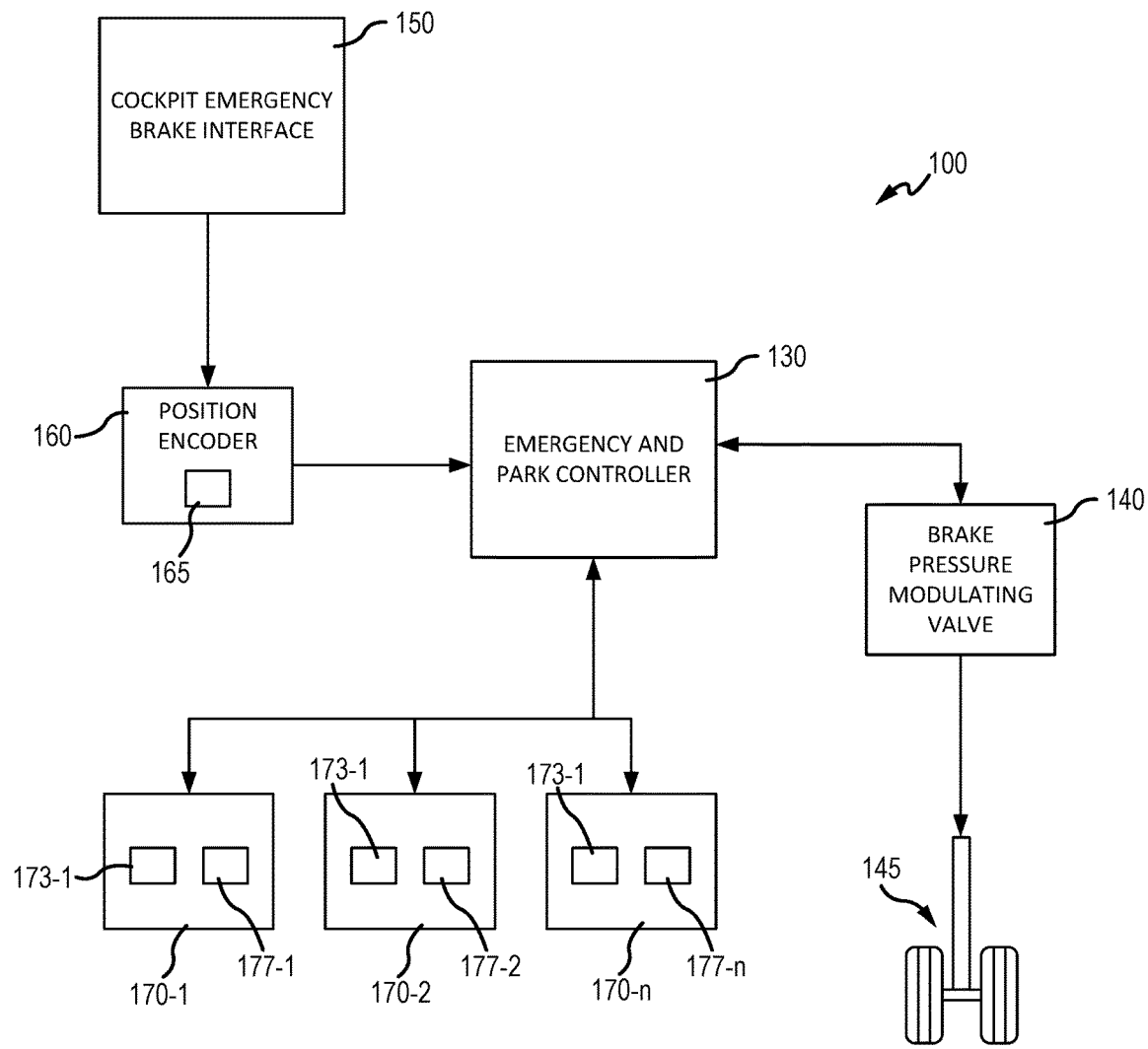
FIG. 2A illustrates a schematic of an emergency and park brake system for hydraulic brakes, in accordance with various embodiments.

Referring now to FIGS. 1 and 2A, in accordance with various embodiments, aircraft 10 may comprise an emergency and park brake system 100. Emergency and park brake system 100 may enable electrically controlled emergency braking and park braking of aircraft 10, such as in response to a failure in the primary brake system. In that respect, emergency and park brake system 100 may also enable emergency braking and park braking from multiple locations in aircraft 10 and/or external from aircraft 10 (as discussed further herein). In various embodiments, emergency and park brake system 100 may comprise a distinct control system from the primary brake system of aircraft 10, such as, for example, to maintain dissimilarity, independence, separation, and/or redundancy, as desired. Emergency and park brake system 100 may also be incorporated into the primary brake system of aircraft 10.

In various embodiments, emergency and park brake system 100 may comprise an emergency and park controller 130 configured to apply emergency brake control and/or park brake control to an aircraft brake 145. As discussed further herein, emergency and park controller 130 may be configured to receive an emergency brake signal and/or a park brake signal, and translate the signals into an actuator force to control braking power. Emergency and park controller 130 may be integrated into computer systems onboard aircraft 10 such as, for example, a brake control unit (BCU), a full authority digital engine control (FADEC), an engine-indicating and crew-alerting system (EICAS), and/or the like. Emergency and park controller 130 may also be a standalone computer system separate from aircraft 10 and in electronic communication with aircraft 10, as described in further detail herein. Emergency and park controller 130 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, emergency and park controller 130 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, emergency and park brake system 100 may comprise one or more interfacing locations from which to transmit emergency brake signals and/or park brake signals to emergency and park controller 130. For example, emergency and park brake system 100 may comprise a cockpit emergency brake interface 150. Cockpit emergency brake interface 150 may be located in any suitable location within aircraft 10, such as, for example, in the cockpit of aircraft 10. In that respect, cockpit emergency brake interface 150 may comprise any suitable mechanical and/or electronic interface allowing a pilot, copilot, and/or the like to transmit an emergency brake signal to emergency and park controller 130. For example, and in various embodiments, cockpit emergency brake interface 150 may comprise an emergency handle configured to be operated by a pilot, copilot, and/or the like in response to an emergency condition (e.g., a failure to the primary brake system). The emergency handle may comprise a "brake by wire" mechanical architecture, in that brake commands may be encoded into electrical signals and input to position encoder 160.

In various embodiments, emergency and park brake system 100 may comprise a position encoder 160 coupled to and/or in operable communication with cockpit emergency brake interface 150. For example, position encoder 160 may be integrated within cockpit emergency brake interface 150, or may be separate from cockpit emergency brake interface 150. Position encoder 160 may be configured to monitor cockpit emergency brake interface 150 to detect an emergency brake signal. For example, and in accordance with various embodiments, position encoder 160 may comprise one or more sensors 165 configured to detect a distance displaced by the emergency handle (e.g., cockpit emergency brake interface 150). Sensor 165 may comprise any suitable sensor, such as, for example, a linear variable differential transformer (LVDT), a rotary variable differential transformer (RVDT), a potentiometer, a magnetic encoder, and/or the like. Position encoder 160 may be in electronic communication with emergency and park controller 130, and may transmit the emergency brake signal to emergency and park controller 130 in response to detecting the emergency brake signal.

In various embodiments, position encoder 160 may transmit the emergency brake signal as a variable emergency brake signal representative of the distance the emergency handle is displaced, either absolutely or as a percentage of displacement from a reference position to a maximum reference position, as measured by sensor 165. The variable emergency brake signal may allow for variable conversion (by emergency and park controller 130) into a desired emergency brake force (e.g., greater displacement in the emergency handle may correspond to greater brake force). For example, where aircraft brake 145 has a maximum pressure of, for example, 3000 psi (20684 kPa), a full (i.e., 100%) displacement of the emergency handle may translate into a variable emergency brake signal of about 3000 psi (20684 kPa); a half (i.e., 50%) displacement of the emergency handle may translate into a variable emergency brake signal of about 1500 psi (10342 kPa); a quarter displacement of the emergency handle may translate into the variable emergency brake signal of about 750 psi (5171 kPa); and/or the like (wherein about in this context refers only to +/−100 psi (690 kPa)). Although an example of a 3000 psi (20684 kPa) brake is provided, it should be understood that the systems and methods herein apply to brakes having any pressure capabilities.

In various embodiments, position encoder 160 may also be configured to transmit the emergency brake signal as a single emergency brake signal. For example, regardless of the displacement in the emergency handle, position encoder 160 may determine that the emergency handle was displaced and transmit the single emergency brake signal to command braking. The single emergency brake signal may comprise data and/or signals indicating a full brake pressure, a half brake pressure, and/or any other suitable predetermined pressure (dependent on brake pressure capabilities).

In various embodiments, emergency and park brake system 100 may also comprise one or more remote emergency and park interfaces 170. For example, emergency and park brake system 100 may comprise a first remote emergency and park interface 170-1, a second remote emergency and park interface 170-2, and/or an "Nth" remote emergency and park interface 170-n. Remote emergency and park interfaces 170 may be in wired and/or wireless communication with emergency and park controller 130, allowing for remote transmission of emergency brake signals and park brake signals. In that respect, and with brief reference to FIG. 1, each remote emergency and park interface 170 may be located in any suitable location, such as, for example, in a cockpit 26, in nose wheel well 28, in main wheel well 30, on nose landing gear 17, in another interface location on aircraft 10, integrated into an autonomous onboard controller, a remote console located externally from aircraft 10 (e.g., at an aircraft maintenance station and/or the like), and/or any other suitable location.

In various embodiments, each remote emergency and park interface 170 may comprise at least an "emergency" switch 173 (e.g., first emergency switch 173-1, a second emergency switch 173-2, and/or a "Nth" emergency switch 173-n) and/or a "park" switch 177 (e.g., a first park switch 177-1, a second park switch 177-2, and/or a "Nth" park switch 177-n). The terms emergency and park are used as labels to describe switches with different functionality as described herein, and are not meant to limit the functionality of said switches to emergency or park, respectively.

In various embodiments, remote emergency and park interfaces 170 may be configured to transmit emergency brake signals and/or park brake signals to emergency and park controller 130. In that regard, emergency switch 173 may be configured to receive input related to emergency braking of aircraft 10 and transmit the emergency brake signal, via the corresponding remote emergency and park interface 170, to emergency and park controller 130. In various embodiments, emergency switch 173 may enable the input of a variable emergency brake signal. In that respect, input into emergency switch 173 may comprise a specified brake pressure to be applied. For example, the variable emergency brake signal may specify a specified brake pressure of about 400 psi (2758 kPA), about 600 psi (4137 kPa), about 1000 psi (6895 kPa), about 1500 psi (10342 kPa), about 3000 psi (20684 kPa), and/or any other suitable and/or desired specified brake pressure (wherein about in this context refers only to +/−100 psi (690 kPa)). Emergency switch 173 may also enable the input of a single emergency brake signal, wherein the single emergency brake signal comprises data to enable full brake pressure, half brake pressure, and/or the like (dependent on brake pressure capabilities).

In various embodiments, park switch 177 may be configured to receive input related to park braking of aircraft 10 and transmit the park brake signal, via the corresponding remote emergency and park interface 170, to emergency and park controller 130. In various embodiments, park switch 177 may enable the input of a variable park brake signal. In that respect, input into park switch 177 may comprise a specified brake pressure to be applied. For example, the variable park brake signal may specify a specified brake pressure of about 400 psi (2758 kPA), about 600 psi (4137 kPa), about 1000 psi (6895 kPa), about 1500 psi (10342 kPa), about 3000 psi (20684 kPa), and/or any other suitable and/or desired specified brake pressure (wherein about in this context refers only to +/−100 psi (690 kPa)). Park switch 177 may also enable the input of a single park brake signal, wherein the single park brake signal comprises data to enable full brake pressure, half brake pressure, and/or the like (dependent on brake pressure capabilities).

In various embodiments, emergency and park controller 130 may be configured to receive the emergency brake signal and/or the park brake signal (e.g., from position encoder 160, remote emergency and park interfaces 170, etc.). Emergency and park controller 130 may analyze and/or process the emergency brake signal and/or the park brake signal to determine the specified braking pressure (e.g., the specified braking pressure in the variable emergency brake signal and/or the variable park brake signal). In various embodiments, emergency and park controller 130 may include flow control logic, which may be referred to as a "voting scheme" for determining which emergency brake signal and/or park brake signal to use (e.g., which emergency brake signal and/or park brake signal on which to base braking force, in response to receiving multiple emergency brake signals and/or park brake signals). The voting scheme may be based on a hierarchy of the sources of emergency brake signals and/or park brake signals. For example, emergency brake signals and/or park brake signals received by position encoder 160, via cockpit emergency brake interface 150, may be given priority over emergency brake signals and/or park brake signals received from other sources (e.g., from park interfaces 170). The voting scheme may also include taking an average of the specified brake pressures in response to receiving multiple emergency brake signals and/or park brake signals, giving priority to the emergency brake signals and/or park brake signals having the greatest specified brake pressure, comparing emergency brake signals and/or park brake signals to determine the similarity of specified brake pressure (e.g., if one emergency brake signal and/or park brake signal is greater than 10% different than the other two emergency brake signals and/or park brake signals and the other two emergency brake signals and/or park brake signals are within 10% of each other, then an average of the two similar emergency brake signals and/or park brake signals are used as the emergency brake signal and/or park brake signal), and/or the like.

In various embodiments, emergency and park controller 130 may transmit a braking command to a brake pressure modulating valve 140. In that respect, emergency and park controller 130 may be in electronic communication with brake pressure modulating valve 140. Brake pressure modulating valve 140 may act as a flow control to control a fluid pressure of brake 145. Brake pressure modulating valve 140 may comprise one or more valves (e.g., servo valves), hydraulic components, electronic components, and/or the like. Brake pressure modulating valve 140 may alter the pressure in brake 145, and thus braking force, in response to receiving the braking command from emergency and park controller 130. The braking command may comprise electronic signals and/or data to actuate brake pressure modulating valve 140 into a position that allows, or restricts, hydraulic fluid flow to pass through brake 145.

Figure 2B:
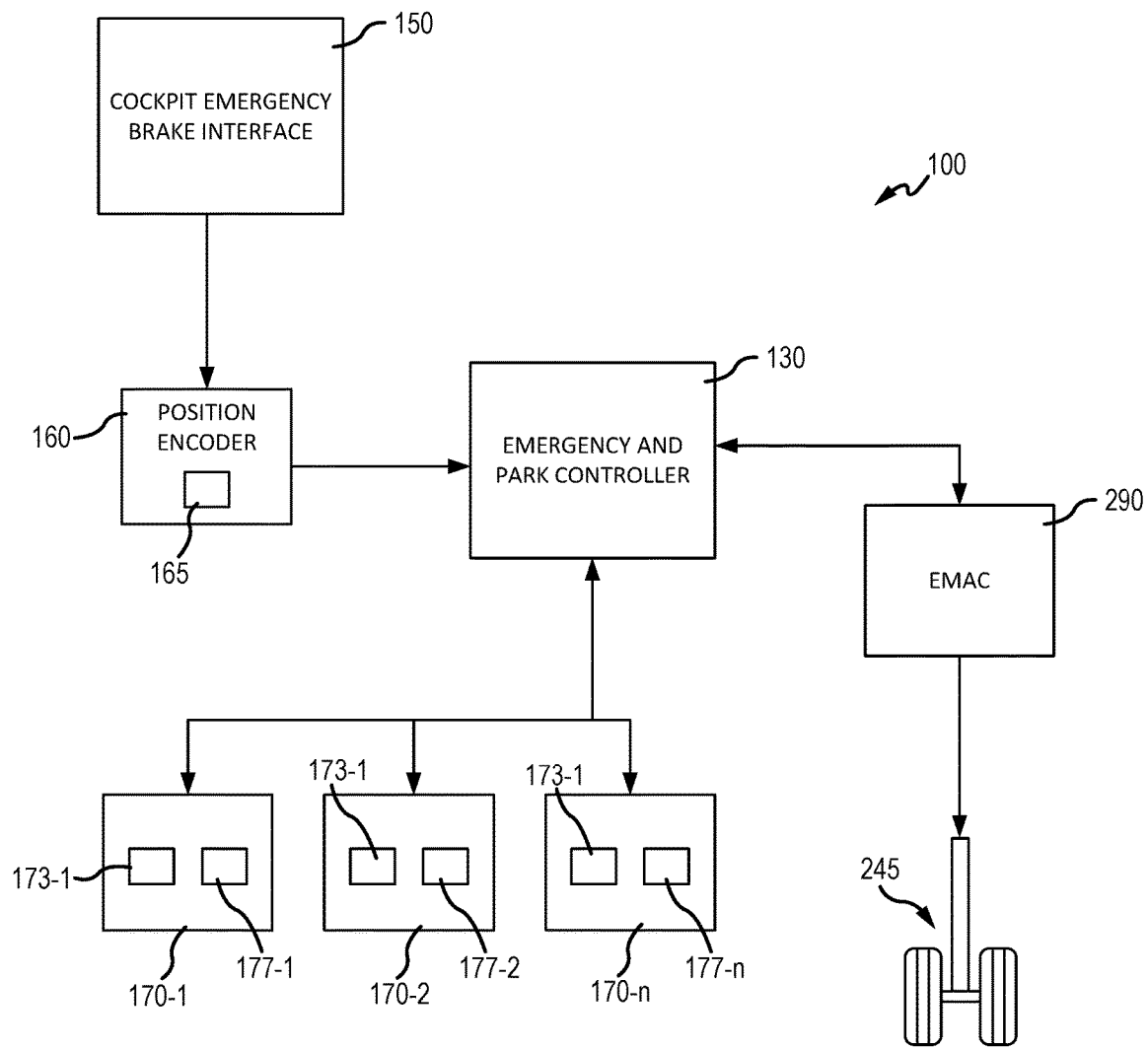
FIG. 2B illustrates a schematic of an emergency and park brake system for electronic brakes, in accordance with various embodiments.

In various embodiments, and with reference to FIG. 2B, emergency and park controller 130 may also be configured to transmit a braking command to an electronic brake 245. In that respect, emergency and park controller 130 may be in electronic communication with one or more electromechanical actuator controllers (EMAC) 290. Each EMAC 290 may provide voltage to one or more electromechanical brake actuators, which in turn drives the electromechanical brake actuators to control braking force. EMAC 290 may alter the pressure in brake 245, and thus braking force, in response to receiving the braking command from emergency and park controller 130. EMAC 290 may contain a computing device (e.g., a processor) and an associated memory. The associated memory may comprise an article of manufacture including a computer-readable medium having instructions stored thereon that, if executed by a computing device (e.g., a processor), cause the computing device to perform various methods. The associated memory may contain executable code for converting the braking commands into a drive signal to drive the electromechanical actuator.

In various embodiments, and with reference again to FIG. 2A, emergency and park controller 130 may also be configured to monitor brake pressure modulating valve 140 to generate a brake status signal. For example, emergency and park controller 130 may monitor brake pressure modulating valve 140 to determine the current status of brake pressure modulating valve 140 (e.g., the current hydraulic fluid flow into brake 145). Emergency and park controller 130 may transmit the brake status signal to each remote emergency and park interface 170. In that regard, emergency and park controller may therefore provide feedback, via the brake status signal, to each remote emergency and park interface 170 indicating the current status of brake pressure modulating valve 140 and brake 145. With brief reference to FIG. 2B, and in various embodiments, emergency and park controller 130 may similarly monitor EMAC 290 to determine the current braking status, and may transmit the brake status signal to each remote emergency and park interface 170.

Figure 3:
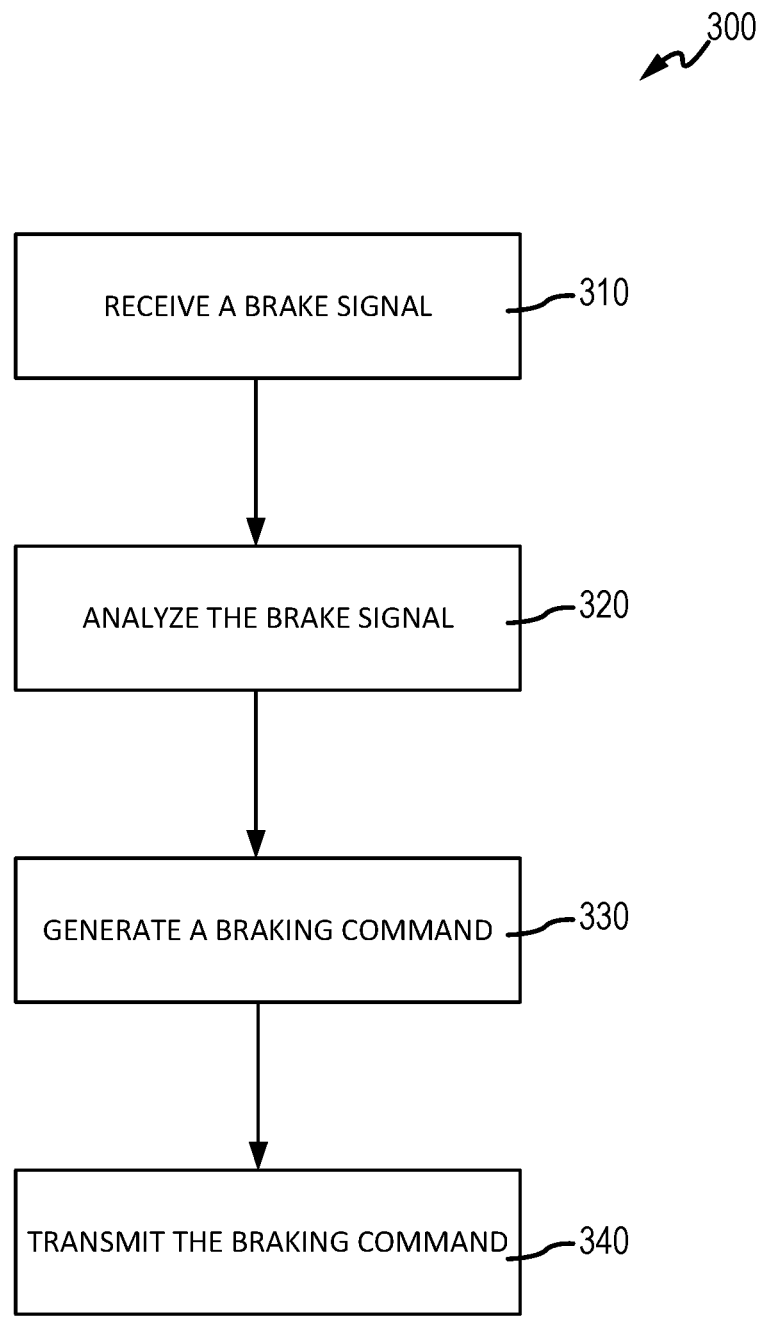
FIG. 3 illustrates a process flow for a method of emergency and park braking, in accordance with various embodiments.

In various embodiments, and with reference to FIG. 3, a method 300 of emergency and park braking is disclosed. Method 300 may comprise receiving a brake signal (step 310). Emergency and park controller 130 may receive the brake signal from any suitable source, such as, for example, position encoder 160, remote emergency and park interfaces 170, and/or the like. The brake signal may comprise an emergency brake signal and/or a park brake signal. The emergency brake signal may comprise a variable emergency brake signal or a single emergency brake signal, as described herein. The park brake signal may comprise a variable park brake signal or a single park brake signal, as described herein.

In various embodiments, method 300 may comprise analyzing the brake signal (step 320). Emergency and park controller 130 may analyze and/or process the brake signal (e.g., the emergency brake signal and/or the park brake signal) to determine a specified brake pressure. In various embodiments, and as described in more detail herein, in response to receiving a plurality of brake signals, emergency and park controller 130 may include a voting scheme for determining which brake signal and/or specified brake pressure to use and apply.

Method 300 may comprise generating a braking command (step 330). Emergency and park controller 130 may generate the braking command. For example, emergency and park controller 130 may generate the braking command to comprise electronic signals to actuate brake pressure modulating valve 140 to allow a hydraulic fluid flow at the specified braking pressure. Method 300 may comprise transmitting a braking command (step 340). Emergency and park controller 130 may transmit the braking command to brake pressure modulating valve 140. In response to receiving the braking command, brake pressure modulating valve 140 may actuate to allow hydraulic fluid flow to pass through to brake 145. With brief reference to FIG. 2B, emergency and park controller 130 may transmit the braking command to EMAC 290. In response to receiving the braking command, EMAC 290 may translate the braking command into a drive signal to drive the electromechanical actuator in electronic brake 245.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An emergency and park brake system for an aircraft, comprising:
    an emergency and park controller having a processor configured to perform operations;
    a position encoder in electronic communication with the emergency and park controller and comprising a sensor configured to detect a brake signal, wherein in response to detecting the brake signal the position encoder is configured to transmit at least one of a first emergency brake signal or a first park brake signal to the emergency and park controller; and
    a remote emergency and park interface integrated into a computer-based system in electronic communication with the emergency and park controller, wherein the remote emergency and park interface is configured to transmit at least one of a second emergency brake signal or a second park brake signal to the emergency and park controller, wherein the remote emergency and park interface is located in a first location external the cockpit of the aircraft, wherein the first location comprises at least one of a nose wheel well, a main wheel well, or a nose landing gear of the aircraft, or a remote console external from the aircraft, wherein the remote emergency and park interface comprises an emergency switch configured to receive input related to the second emergency brake signal and a park switch configured to receive input related to the second park brake signal, and wherein the emergency and park controller is configured to generate a braking command in response to receiving at least one of the first emergency brake signal, the second emergency brake signal, the first park brake signal, or the second park brake signal, and wherein the emergency and park controller transmits the braking command to an aircraft brake of the aircraft, wherein in response to receiving the braking command the aircraft brake is configured to control a braking force in the aircraft brake.

2. The emergency and park brake system of claim 1, further comprising a brake pressure modulating valve in electronic communication with the emergency and park controller, wherein the brake pressure modulating valve is configured to control a fluid pressure to the aircraft brake in response to the aircraft brake receiving the braking command from the emergency and park controller.

3. The emergency and park brake system of claim 1, further comprising an electromechanical actuator controller (EMAC) in electronic communication with the emergency and park controller, wherein the EMAC is configured to control a braking force in the aircraft brake in response to the aircraft brake receiving the braking command from the emergency and park controller.

4. The emergency and park brake system of claim 1, further comprising an emergency brake handle in operable communication with the position encoder, wherein the position encoder is configured to measure a displacement of the emergency brake handle.

5. The emergency and park brake system of claim 4, wherein in response to measuring the displacement the position encoder is configured to transmit the first emergency brake signal related to the displacement of the emergency brake handle to the emergency and park controller.

6. The emergency and park brake system of claim 4, wherein the emergency brake handle is located in the cockpit of the aircraft.

7. The emergency and park brake system of claim 1, wherein at least one of the first emergency brake signal or the second emergency brake signal comprises at least one of a variable emergency brake signal or a single emergency brake signal.

8. The emergency and park brake system of claim 1, wherein at least one of the first park brake signal or the second park brake signal comprises at least one of a variable park brake signal or a single park brake signal.

9. The emergency and park brake system of claim 1, wherein the emergency and park controller is configured to generate a brake status signal representative of a current state of the aircraft brake.

10. The emergency and park brake system of claim 1, wherein the remote emergency and park interface is in wireless communication with the emergency and park controller.

11. A method of controlling an emergency and park brake system, comprising:
receiving, by an emergency and park controller, a brake signal from a position encoder having a sensor configured to detect the brake signal, and a remote emergency and park interface integrated into a computer-based system located in a first location external the cockpit of an aircraft, wherein the first location comprises at least one of a nose wheel well, a main wheel well, or a nose landing gear of the aircraft, or a remote console external from the aircraft, and wherein the remote emergency and park interface comprises at least one of an emergency switch or a park switch that receives input related to the brake signal;
generating, by the emergency and park controller, a braking command comprising data from the brake signal; and
transmitting, by the emergency and park controller, the braking command to an aircraft brake, wherein in response to receiving the braking command the aircraft brake is configured to control a braking force in the aircraft brake.

12. The method of claim 11, wherein the brake signal comprises an emergency brake signal having at least one of a variable emergency brake signal or a single emergency brake signal.

13. The method of claim 11, wherein the brake signal comprises a park brake signal having at least one of a variable park brake signal or a single park brake signal.

14. The method of claim 11, wherein the position encoder is configured to measure a displacement of an emergency brake handle, and transmit the brake signal related to the displacement of the emergency brake handle.

15. An emergency and park brake system, comprising:
an emergency and park controller having a processor;
a tangible, non-transitory memory configured to communicate with the processor, the tangible, non-transitory memory having instructions stored thereon that, in response to execution by the processor, cause the emergency and park brake system to perform operations comprising:
receiving, by the processor, a brake signal from at least one of a position encoder having a sensor configured to detect the brake signal, or a remote emergency and park interface integrated into a computer-based system located in a first location external the cockpit of an aircraft, wherein the first location comprises at least one of a nose wheel well, a main wheel well, or a nose landing gear of the aircraft, or a remote console external from the aircraft, and wherein the remote emergency and park interface comprises at least one of an emergency switch or a park switch configured to receive input related to the brake signal;
generating, by the processor, a braking command comprising data from the brake signal; and
transmitting, by the processor, the braking command to an aircraft brake, wherein in response to receiving the braking command the aircraft brake is configured to control a braking force in the aircraft brake.

16. The emergency and park brake system of claim 15, wherein the brake signal comprises an emergency brake signal having at least one of a variable emergency brake signal or a single emergency brake signal.

17. The emergency and park brake system of claim 15, wherein the brake signal comprises a park brake signal having at least one of a variable park brake signal or a single park brake signal.

18. The emergency and park brake system of claim 15, wherein the operations further comprise generating, by the processor, a brake status signal representative of a current state of the aircraft brake.

19. The emergency and park brake system of claim 18, wherein the operations further comprise transmitting, by the processor, the brake status signal to the remote emergency and park interface.

\* \* \* \* \*